United States Patent
Kogure (10) Patent No.: US 8,937,676 B2
(45) Date of Patent: Jan. 20, 2015

(54) VIDEO PROCESSING APPARATUS, IMAGING APPARATUS, VIDEO PROCESSING METHOD, AND STORAGE MEDIUM

(75) Inventor: Kentaro Kogure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 13/281,239

(22) Filed: Oct. 25, 2011

(65) Prior Publication Data

US 2012/0105702 A1    May 3, 2012

(30) Foreign Application Priority Data

Oct. 28, 2010 (JP) .................... 2010-242225

(51) Int. Cl.
*H04N 5/222* (2006.01)
*G06T 3/00* (2006.01)
*H04N 5/77* (2006.01)

(52) U.S. Cl.
CPC .............. *G06T 3/0031* (2013.01); *H04N 5/772* (2013.01)
USPC .................................. 348/333.02

(58) Field of Classification Search
CPC ............ H04N 5/23238; H04N 5/2628; H04N 5/2259; H04N 7/181; H04N 13/0055; H04N 13/0497; H04N 5/232; H04N 2101/00; H04N 2201/0084; H04N 9/045; H04N 5/772; H04N 5/23293; H04N 5/66; H04N 7/18; G09G 3/3406; G09G 2310/08; G01B 11/022; G01B 11/024

USPC ........ 348/36, 39, 207.99, 222.1, 333.02, 739, 348/135; 345/420, 423
See application file for complete search history.

(56) References Cited

U.S. PATENT DOCUMENTS

| | | | |
|---|---|---|---|
| 6,788,828 B2 * | 9/2004 | Katayama et al. | ............ 382/284 |
| 2008/0074489 A1 * | 3/2008 | Zhang et al. | ..................... 348/36 |
| 2008/0158226 A1 * | 7/2008 | Shimizu | ........................ 345/420 |
| 2012/0056977 A1 * | 3/2012 | Ohnishi | .......................... 348/36 |
| 2013/0100132 A1 * | 4/2013 | Katayama et al. | ............ 345/420 |
| 2014/0049655 A1 * | 2/2014 | Iwasaki | ..................... 348/207.1 |

FOREIGN PATENT DOCUMENTS

| | | |
|---|---|---|
| JP | 2001-069494 A | 3/2001 |
| JP | 2002-027466 A | 1/2002 |
| JP | 2006-222721 A | 8/2006 |
| JP | 2006-304122 A | 11/2006 |
| JP | 2007-129336 A | 5/2007 |

* cited by examiner

*Primary Examiner* — Aung S Moe
(74) *Attorney, Agent, or Firm* — Canon USA Inc. IP Division

(57) ABSTRACT

A video processing method includes calculating mean values with respect to x coordinate value and y coordinate value of vertices that define a corresponding area, which is obtained when a designated area in spherical coordinates is projected on an xy coordinate plane that represents a captured image, and superimposing a mask image R on the captured image in such a way as to bring a point G having an x coordinate value and a y coordinate value identical to the calculated mean values with respect to the x coordinate value and the y coordinate value into coincidence with a point defined by a midpoint in the height direction and a midpoint in the width direction of the mask image.

10 Claims, 10 Drawing Sheets

FIG. 4A
IMAGING SPACE AND SPHERICAL COORDINATES

FIG. 4B
DRAWING PLANE

IMAGING SPACE AND
SPHERICAL COORDINATES

FIG. 7B

DRAWING PLANE

VIDEO PROCESSING APPARATUS, IMAGING APPARATUS, VIDEO PROCESSING METHOD, AND STORAGE MEDIUM

BACKGROUND OF THE INVENTION

1. Field of the Invention

The present invention relates to a video processing apparatus that can display a captured image together with a mask image superimposed at a mask area thereof, and further relates to an imaging apparatus, a video processing method, and a storage medium.

2. Description of the Related Art

There is a conventionally known masking technique capable of superimposing a mask image on a partial area of an image captured by an imaging apparatus to prevent a specific image portion on which the mask image is superimposed from being viewed.

Figure 8A:
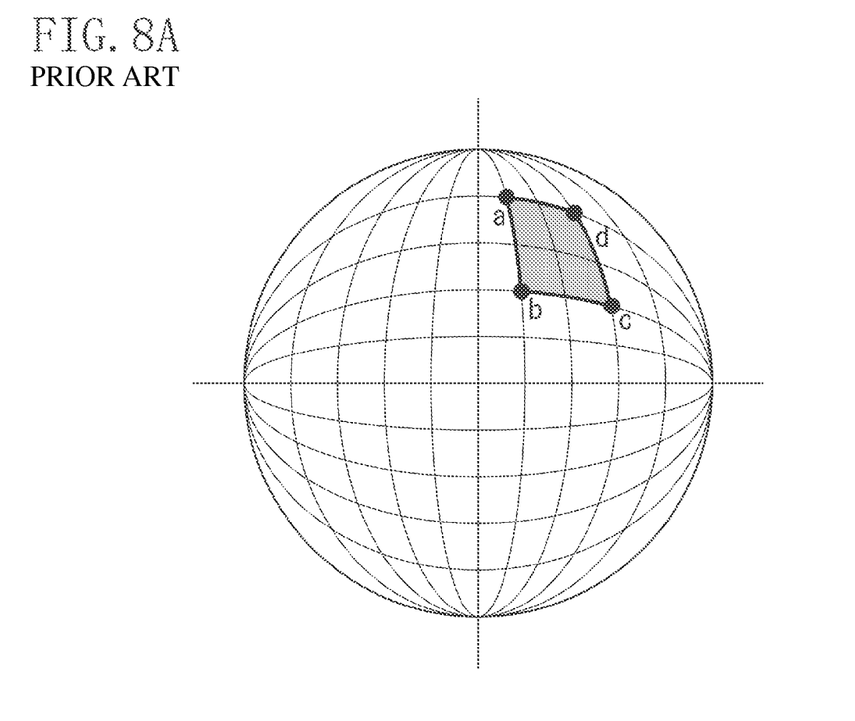
FIG. 8A illustrates an area in the spherical coordinates.
Figure 8B:
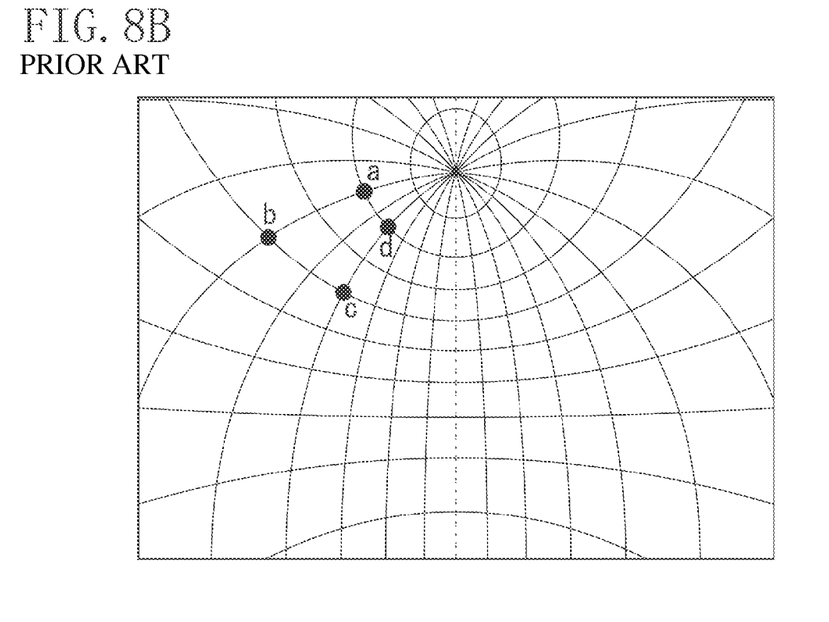
FIG. 8B illustrates a projected image obtainable when the spherical area illustrated in FIG. 8A is projected on a flat plane.

In general, an image capturing area (hereinafter, referred to as "imaging area") of an imaging apparatus can be expressed as an area in spherical coordinates illustrated in FIG. 8A, in which the imaging apparatus is positioned at the center thereof, when the imaging apparatus faces a predetermined direction. Further, FIG. 8B illustrates a projected image obtainable when a captured image of the imaging area in the spherical coordinates is projected on a flat plane. As understood from FIG. 8B, an image portion positioned in a peripheral region of the captured image is greatly distorted when it is projected on the flat plane, compared to an image portion positioned at the center of the captured image.

In such an imaging apparatus, if superimposition of a mask image is performed using the above-described masking technique, an area to be covered by the mask (hereinafter, referred to as "mask area") having been set in the spherical coordinates may become a distorted area on a flat plane. For example, when a mask area "abcd" is set as a mask setting area as illustrated in FIG. 8A, if the mask area "abcd" is projected on a plane, the area "abcd" becomes a distorted area as understood from FIG. 8B.

Hence, as discussed in Japanese Patent Application Laid-Open No. 2001-069494, a conventional imaging apparatus is arranged to adjust an imaging direction thereof in such a way as to bring the center of the imaging area into coincidence with the center of a mask area to be set. Therefore, it becomes feasible to perform mask area setting at a central region of a screen.

However, in a case where the imaging direction of the imaging apparatus is fixed, it is unfeasible to adjust the imaging direction for the mask area setting. Accordingly, a mask area having been set in the spherical coordinates may become a distorted area when it is projected on a flat plane. Further, even in a case where the imaging direction is changeable, a significant amount of time and labor will be required if the direction of a camera is changed each time when the mask area setting is performed.

SUMMARY OF THE INVENTION

According to an aspect of the present invention, a video processing apparatus includes an identifying unit configured to identify a designated area in spherical coordinates that include an imaging unit positioned at the center thereof; a display control unit configured to cause a display unit to display an image captured by the imaging unit; a superimposing unit configured to superimpose a mask image on a corresponding area, which is obtainable when the designated area is projected on an xy coordinate plane that represents the captured image to be displayed on the display unit; and a calculation unit configured to calculate mean values with respect to x coordinate value and y coordinate value of vertices that define the corresponding area, on the xy coordinate plane, wherein the superimposing unit is configured to superimpose the mask image on the captured image in such a way as to bring a point having an x coordinate value and a y coordinate value identical to the mean values calculated by the calculation unit with respect to the x coordinate value and the y coordinate value into coincidence with a point defined by a midpoint in the height direction and a midpoint in the width direction of the mask image on the xy coordinate plane.

The video processing apparatus according to the present invention can appropriately superimpose a mask image on a mask area to be covered on a flat plane without increasing the labor and time required in performing mask area settings.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
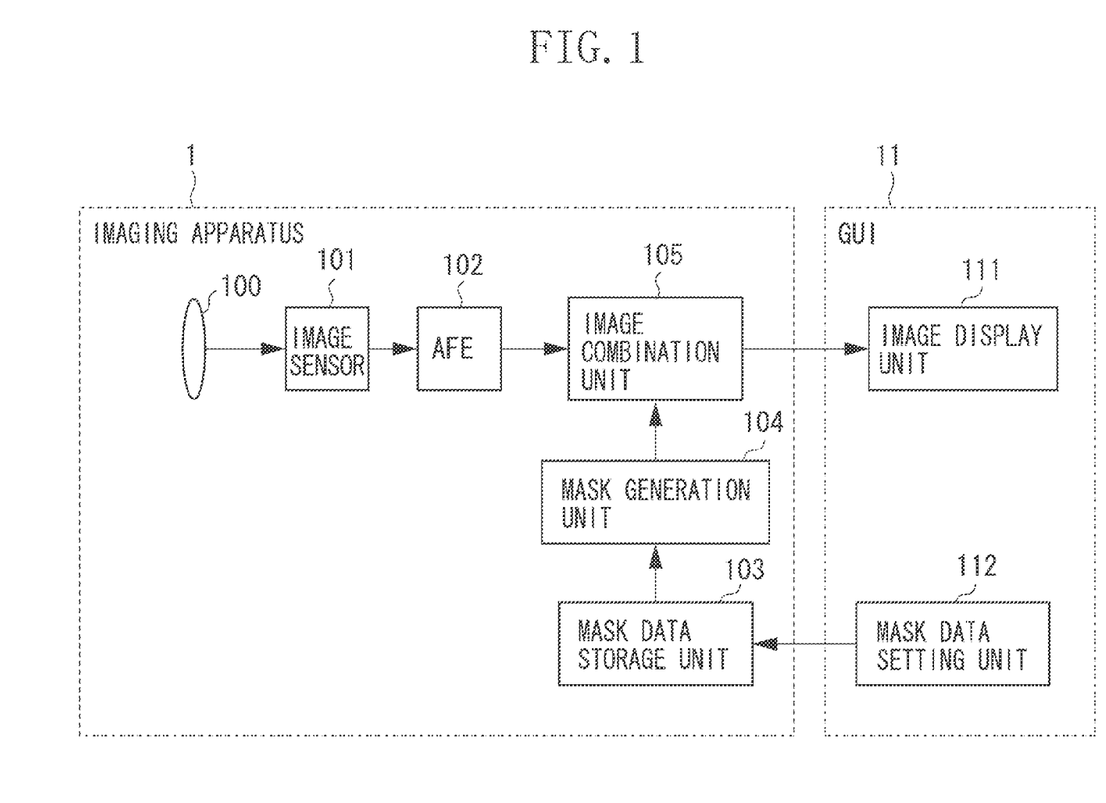
FIG. 1 is a block diagram illustrating an imaging apparatus 1 and a graphical user interface (GUI) 11 according to a first exemplary embodiment of the present invention.

First, an example configuration of an imaging apparatus 1 according to a first exemplary embodiment of the present invention is described below with reference to FIG. 1. An imaging lens 100 causes incident light to focus on an image sensor 101. The image sensor 101 can generate an image signal representing a captured image having been focused by the imaging lens 100.

Analog Front End (AFE) 102 is an analog circuit that can convert an analog signal into a digital signal. The AFE 102 includes a circuit that can amplify the image signal generated by the image sensor 101 and can remove not only an amplification noise component but also a reset noise component included in the image signal. The AFE 102 can convert the image signal output from the image sensor 101 into a digital signal and can output a captured image to an image combination unit 105.

A mask data storage unit 103 can acquire and identify mask data when a user designates the mask data via a mask data setting unit 112. In the present exemplary embodiment, the mask data is positional information that is usable to identify an area where a mask image is superimposed (hereinafter, referred to as "mask area") in spherical coordinates that include the imaging apparatus positioned at the center thereof.

A mask generation unit 104 can acquire mask data from the mask data storage unit 103 and can generate a mask image based the acquired mask data in the following manner.

First, the mask generation unit 104 identifies a corresponding area, which represents a projection area obtainable when a mask area is projected on an xy coordinate plane, which represents a captured image to be displayed on an image display unit 111. Then, the mask generation unit 104 calculates mean values with respect to the x coordinate value and the y coordinate value of respective vertices that define the corresponding area on the xy coordinate plane.

Further, the mask generation unit 104 derives the width and the height of the mask image on the xy coordinate plane based on the positional information. Finally, the mask generation unit 104 generates a mask image based on the calculated width/height information of the mask image.

The mask image is not limited to a rectangular shape. The width of the mask image is a difference between a maximum value and a minimum value with respect to the x coordinate that represents the vertex of the mask image on the xy plane. Further, the height of the mask image is a difference between a maximum value and a minimum value with respect to the y coordinate that represents the vertex of the mask image on the xy plane.

The image combination unit 105 can superimpose the mask image on the captured image output from the AFE 102 in such a way as to position the mask image generated by the mask generation unit 104 in accordance with the above-described corresponding area.

More specifically, the image combination unit 105 superimposes the mask image on the captured image on the xy coordinate plane in such a way as to bring a point defined by an average x coordinate value and an average y coordinate value, which can be calculated by the mask generation unit 104, into coincidence with a point defined by a midpoint in the height direction and a midpoint in the width direction of the mask image generated by the mask generation unit 104.

Further, the image combination unit 105 can perform a display control to cause the image display unit 111 to display the captured image together with the superimposed mask image. Further, if there is no mask image to be superimposed on the captured image, the image combination unit 105 does not superimpose any mask image when the image combination unit 105 performs the display control to display the captured image on the image display unit 111.

If the imaging apparatus 1 includes a built-in processor and a built-in memory, functions of the mask generation unit 104 and the image combination unit 105 can be realized by the processor when the processor executes a program stored in the memory. Alternatively, an appropriate hardware configuration may be employed to constitute the mask generation unit 104 and the image combination unit 105.

Next, a graphical user interface (GUI) 11 of the imaging apparatus 1 according to the present exemplary embodiment is described below. In the present exemplary embodiment, the GUI 11 is directly connected to the imaging apparatus 1. However, as another embodiment, the GUI 11 can be connected to a network so that the GUI 11 can communicate with the imaging apparatus 1 via the network.

The GUI 11 includes the image display unit 111 and the mask data setting unit 112. The image display unit 111 can receive a captured image including a superimposed mask image from the image combination unit 105, and can display the captured image including the superimposed mask image. The mask data setting unit 112 can set mask data to be superimposed on a captured image when the captured image is displayed on the image display unit 111. An example setting of the mask data is described below with reference to FIG. 2.

An appropriate hardware configuration is employable to constitute the image display unit 111 and the mask data setting unit 112. Alternatively, if the GUI 11 includes a processor and a memory, the processor is functionally operable as the mask data setting unit 112 when the processor executes a program loaded from the memory.

Subsequently, an example setting of the mask data that can be performed by the GUI 11 according to the present exemplary embodiment is described below with reference to FIG. 2. If the GUI 11 includes a built-in processor and a built-in memory, a processing flow illustrated in FIG. 2 indicates an example procedure of the processing that the processor executes according to a program stored in the built-in memory.

The built-in processor of the GUI 11 is a computer, which can execute the program loaded from the built-in memory of the GUI 11 to control the mask data setting unit 112. The built-in memory of the GUI 11 is a storage medium that stores the above-described program so that the program can be read by the processor when accessed by the processor.

First, in step S201, the mask data setting unit 112 of the GUI 11 determines whether any setting values relating to the mask area have been input by a user.

As an example method for setting a mask area, users can designate a start point of a rectangle of the mask area, in addition to the height and the width, on a captured image displayed on the image display unit 111. For example, users can perform a drag and drop operation with a pointing device (e.g., a mouse). Alternatively, users can input numerical values in an input field displayed on the image display unit 111 to designate the start point, the height, and the width.

It is useful to hold color information to display a colored mask area in addition to information representing the start point, the height, and the width. Alternatively, it is useful to enable users to select the method for designating a mask area with a pointing device or the method for designating a mask area by inputting numerical values in the input field.

Alternatively, users can designate the center of a mask area on a captured image displayed on the image display unit 111, and then designate one vertex of the mask area to set a rectangular area in which the mask to be superimposed is placed. The mask area setting method is not limited to the above-described methods. Any other method is employable if it can designate the height and the width of a mask area as well as the position of the mask area relative to a captured image.

If it is determined that the setting values relating to the mask area have been input (Yes in step S201), the processing proceeds to step S202. In step S202, the mask data setting unit 112 outputs coordinate data representing the lower left vertex of the mask area in the imaging area in addition to height/width information of the mask area, as mask data, to the mask data storage unit 103 of the imaging apparatus 1.

Subsequently, in step S203, the mask data setting unit 112 determines whether the total number of masks having been set exceeds the maximum number of masks that can be stored by the mask data storage unit 103. If it is determined that the total number of masks having been set does not exceed the maximum number of storable masks (No in step S203), the processing returns to step S201.

Figure 2:
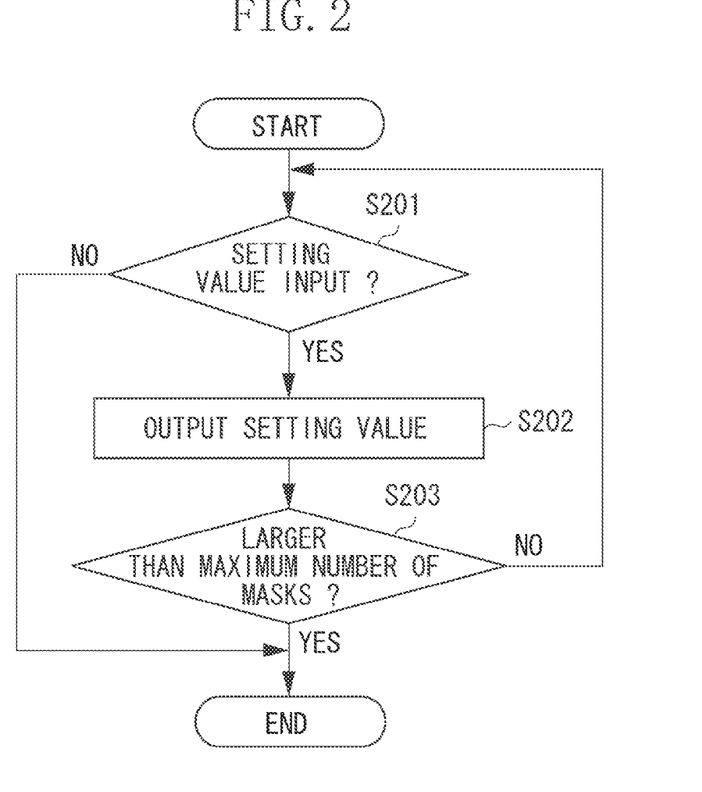
FIG. 2 is a flowchart illustrating an example procedure of mask data setting processing according to the first exemplary embodiment of the present invention.

On the other hand, if it is determined that the total number of masks having been set exceeds the maximum number of storable masks (Yes in step S203), the mask data setting unit 112 terminates the mask setting processing illustrated in FIG. 2. As another embodiment, it is feasible to configure the mask data storage unit 103 of the imaging apparatus 1 to perform the determination of whether the total number of masks having been set exceeds the maximum number of storable masks.

Figure 3:
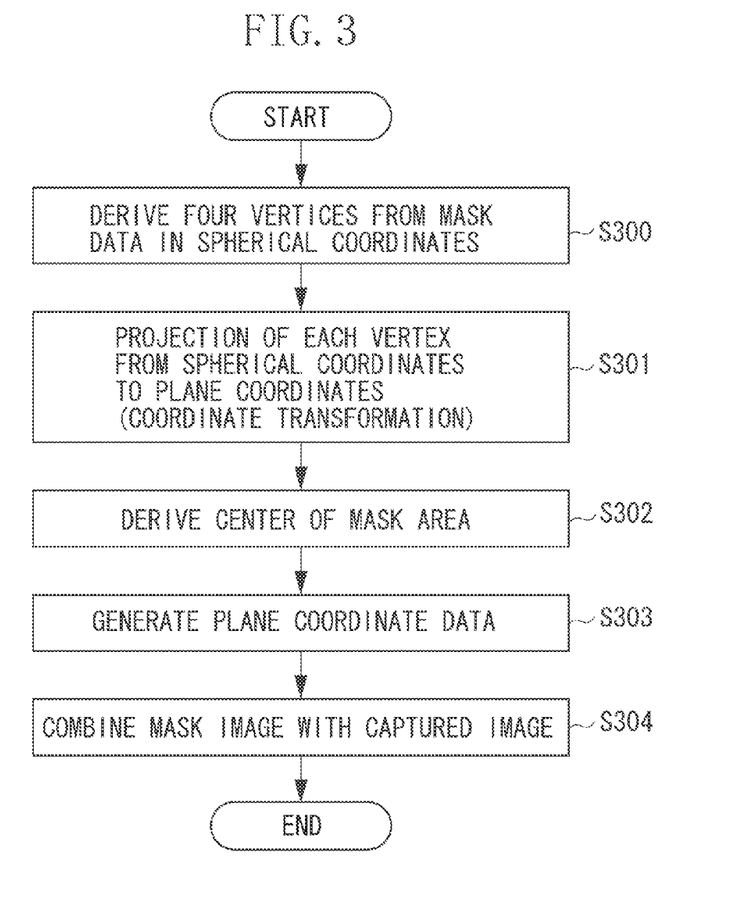
FIG. 3 is a flowchart illustrating an example procedure of mask image generation processing according to the first exemplary embodiment of the present invention.

Next, an example operation that can be performed by the mask generation unit 104 to generate a mask image based on the mask data having been set is described below with reference to FIG. 3. If the imaging apparatus 1 includes a built-in processor and a built-in memory, a processing flow illustrated in FIG. 3 indicates an example procedure of the processing that the processor can execute according to a program stored in the built-in memory.

The built-in processor of the imaging apparatus 1 is a computer, which can execute the program loaded from the built-in memory of the imaging apparatus 1 to control the mask generation unit 104. The built-in memory of the imaging apparatus 1 is a storage medium that stores the above-described program so that the program can be read by the processor when accessed by the processor.

First, in step S300, the mask generation unit 104 derives each vertex of a mask area in the spherical coordinates, which include the imaging apparatus 1 positioned at the center thereof, based on the mask data stored in the mask data storage unit 103. An example method for deriving each vertex of a mask area is described below with reference to FIG. 4A. According to the present exemplary embodiment, it is presumed that the mask area has a rectangular shape. However, the shape of the mask area is not limited to a rectangular shape.

Figure 4A:
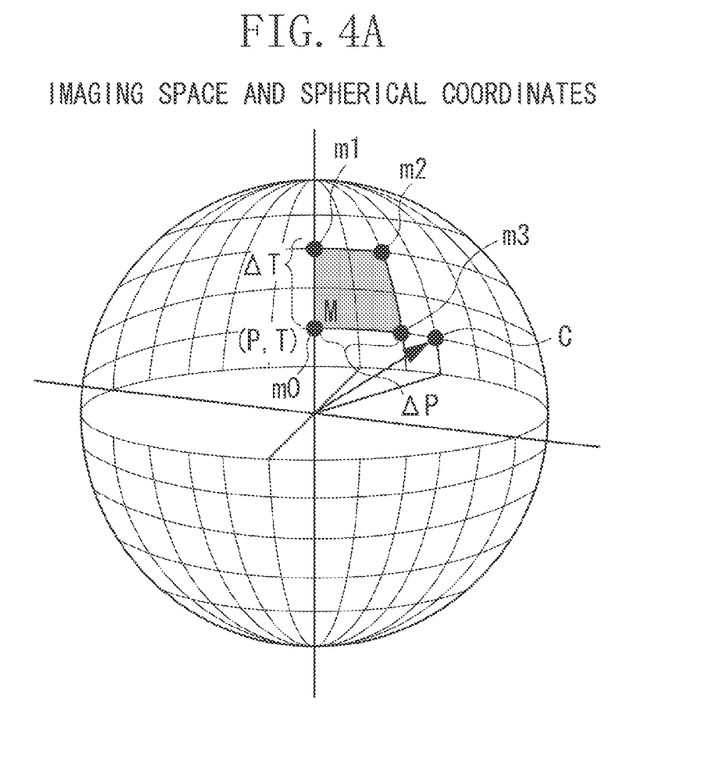
FIG. 4A illustrates spherical coordinates, which include the imaging apparatus 1 positioned at the center thereof, according to the first exemplary embodiment of the present invention.

FIG. 4A illustrates spherical coordinates, in which the imaging apparatus 1 is positioned at the center thereof. A mask area M can be disposed in the spherical coordinates as illustrated in FIG. 4A, in which m0(P, T) represents a start point of the mask area in the spherical coordinates, ΔP represents the width of the mask area, and ΔT represents the height of the mask area. In the spherical coordinates, four vertices of the mask area M can be represented by m0(P, T), m1(P, T+ΔT), m2(P+ΔP, T+ΔT), and m3(P+ΔP, T), respectively.

Figure 4B:
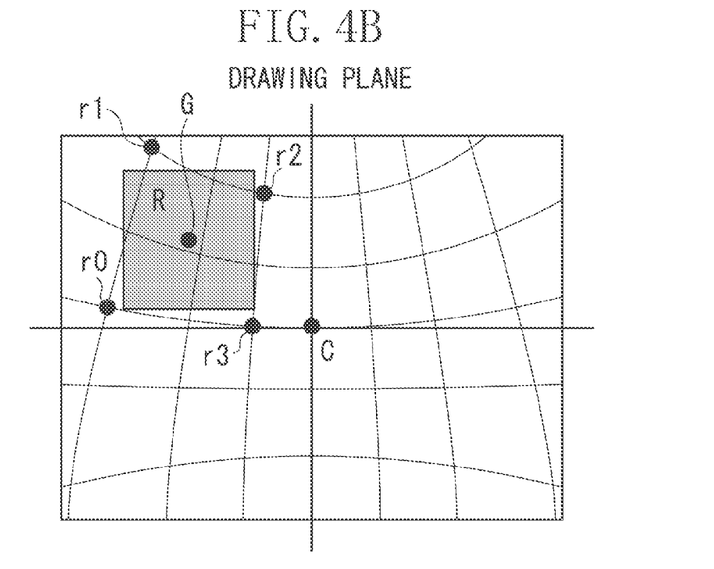
FIG. 4B illustrates a corresponding area, which is seen from the center of the spherical coordinates, when a mask area M is projected on the coordinate plane according to the first exemplary embodiment of the present invention.

Next, in step S301, the mask generation unit 104 projects each vertex of the mask area M defined in the spherical coordinates onto a coordinate plane. FIG. 4B illustrates a corresponding area r0r1r2r3, which is seen from the center of the spherical coordinates, when the mask area M is projected on the coordinate plane. In the present exemplary embodiment, the mask generation unit 104 is configured to project the mask area M on the coordinate plane, which contacts at a point "C" with the coordinate spherical, when the point "C" is an intersection point of the optical axis of the imaging lens 100 and the coordinate spherical.

The projection of the mask area M onto the coordinate plane can be realized by converting spherical coordinates representing four vertices of the mask area M derived in step S300 into corresponding plane coordinates.

Figure 4C:
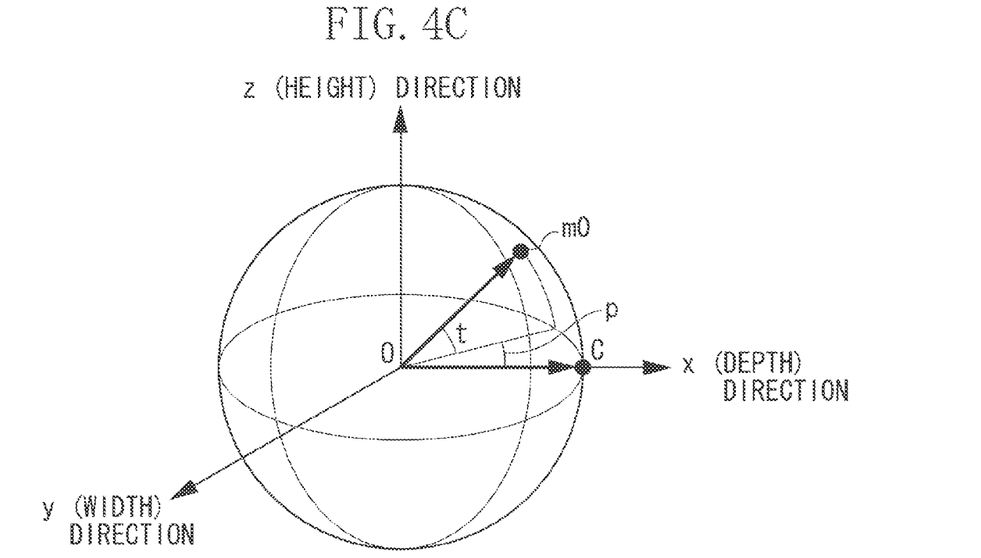
FIG. 4C illustrates coordinate axes in the spherical coordinates according to the first exemplary embodiment of the present invention.

Hereinafter, an example conversion of vertex coordinates of the mask area M is described for each of depth component x, width component y, and height component z. As illustrated in FIG. 4C, "O" represents the center of the coordinate spherical, and the x axis is set to be identical to the direction of the optical axis when the imaging lens 100 of the imaging apparatus 1 is located at the center "O" of the coordinate spherical. Further, it is presumed that the radius of the coordinate spherical is equal to 1.

As an example, the coordinate conversion of the vertex m0 is described below. As illustrated in FIG. 4C, the vector extending from the point "O" to the point "C" is defined as a reference direction of the imaging apparatus 1. The point m0 has an angle "p" relative to the reference direction in the horizontal direction and an angle "t" in the vertical direction.

First, the mask generation unit 104 obtains the position of the vertex m0 relative to the point "O." The position of the vertex m0 relative to the point "O" can be defined in the following manner with respect to each of the depth component x, the width component y, and the height component z.

$$|m0-Ox|=\cos(t)\cos(p)$$

$$|m0-Oy|=\sin(p)\cos(t)$$

$$|m0-Oz|=\sin(t) \quad \text{(Formula 1)}$$

Figure 4D:
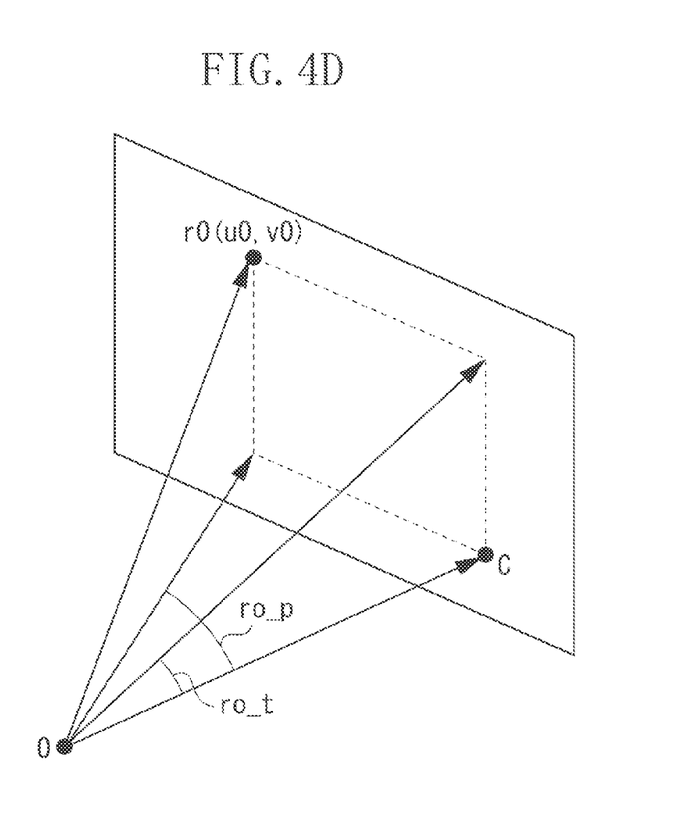
FIG. 4D illustrates projection conversion of the mask area according to the first exemplary embodiment of the present invention.

Next, the mask generation unit 104 obtains coordinate values of the point r0 on the coordinate plane. The point r0 is a projected point of the point m0 defined in the spherical coordinates. The coordinate plane contacts the spherical coordinates at the point "C." As illustrated in FIG. 4D, r0_p and r0_t represent the horizontal angle and the vertical angle between the point "C" and the point r0, respectively. These angles r0_p and r0_t can be defined by the following formulae.

$$r0\_p=\arctan(|m0-Oy|/|m0-Ox|)$$

$$r0\_t=\arctan(|m0-Oz|/|m0-Ox|) \quad \text{(Formula 2)}$$

Further, u0 and v0 represent the x component and the y component of the point r0 on the plane coordinates, respectively. When coordinate values Cx and Cy of the point C define the origin, the x component u0 and the y component v0 can be defined by the following formulae.

$u0 = Cx - (\text{width of image display area}) * (r0\bar{~}p/\text{horizontal angle of view of the imaging apparatus 1})$ $v0 = Cy + (\text{height of image display area}) * (r0\bar{~}t/\text{vertical angle of view of the imaging apparatus 1})$ (Formula 3)

In the present exemplary embodiment, it is presumed that width/height information of the image display area is stored beforehand in the mask generation unit 104. Further, when the aspect ratio of the screen is taken into consideration, it is useful to multiply the width or the height of the image display area by the aspect ratio in the calculation defined by the above-described Formula 3. Similar to the point m0, it is feasible to convert other vertex points m1, m2, and m3. As a result, the mask generation unit 104 can obtain plane coordinates r1(u1, v1), r2(u2, v2), and r3(u3, v3) on the image display area.

In the above-described embodiment, an example method is employed to project an area defined in the spherical coordinates onto a coordinate plane. However, the conversion method is not limited to the above-described method. Any other method is employable if it can obtain coordinate values of vertices that define the corresponding area, i.e., an area obtainable when a designated area defined in the spherical coordinates is projected on the coordinate plane.

As described above, the mask generation unit 104 can identify a corresponding area, i.e., an area obtainable when the mask area is projected on the xy coordinate plane, which represents a captured image to be displayed on the image display unit 111.

Next, in step S302, the mask generation unit 104 derives plane coordinates of a central point of the mask area M by calculating the arithmetic mean of coordinate values representing respective points r0, r1, r2, and r3. When gu and gv represent mean values with respect to the x coordinate value and the y coordinate value of four vertices that define the mask area M, i.e., the values derived in step S301, on the coordinate plane, the central point G(gu, gv) can be defined by the following formulae.

$gu = (u0 + u1 + u2 + u3)/4$ $gv = (v0 + v1 + v2 + v3)/4$ (Formula 4)

As described above, the mask generation unit 104 calculates mean values with respect to the x coordinate value and the y coordinate value of respective vertices that define the corresponding area on the xy coordinate plane.

Subsequently, in step S303, the mask generation unit 104 obtains the width and the height of a mask image to be superimposed on the corresponding area. When W and H represent the width and the height of the mask image, respectively, these values can be defined by the following formulae.

$W = (\text{width of image display area}) * \Delta p / (\text{horizontal angle of view of the imaging apparatus 1})$ $H = (\text{height of image display area}) * \Delta t / (\text{vertical angle of view of the imaging apparatus 1})$ (Formula 5)

In the formula 5, $\Delta p$ represents an angle between the point m0 and the point m3 on the xy plane of the xyz space illustrated in FIG. 4C. Further, $\Delta t$ represents an angle between the point m0 and the point m1 on the xz plane of the xyz space illustrated in FIG. 4C. In the method for calculating the width and the height of the mask image, it is feasible to calculate W and H values considering the aspect ratio of the screen, similar to the calculation defined by the above-described Formula 3.

The method for calculating the width and the height of the mask image is not limited to the above-described method. For example, it is feasible to calculate the width and the height of the mask image appropriately based on the setting values input in step S201. As described above, the mask generation unit 104 calculates the width and the height of the mask image on the xy coordinate plane based on the positional information.

If it is assumed that the mask image to be superimposed according to the present exemplary embodiment has a rectangular shape, the lower left reference point of the mask image has coordinate values (X, Y) that can be expressed using the following equation.

$X = gu - W/2$ $Y = gv - H/2$ (Formula 6)

Through the above-described procedure, the mask generation unit 104 can acquire plane coordinate data R (X, Y, W, H) to combine the mask image with the captured image.

Subsequently, in step S304, the mask generation unit 104 causes the image combination unit 105 to combine the mask image having the width W and the height H with the captured image from a start point defined by plane coordinate data (X, Y).

In response to an instruction received from the mask generation unit 104, the image combination unit 105 superimposes the mask image on the captured image. As described above, the image combination unit 105 superimposes the mask image on the captured image in such a way as to bring a point defined by an average x coordinate value and an average y coordinate value calculated by the mask generation unit 104 into coincidence with a point defined by a midpoint in the height direction and a midpoint in the width direction of the mask image.

Subsequently, the image combination unit 105 causes the image display unit 111 to display the captured image having been combined with the mask image. If there is a plurality of pieces of mask data, the mask generation unit 104 and the image combination unit 105 can repeat the processing according to the above-described procedure to display each mask image on a designated part of the captured image.

If each mask data holds color information, it is useful to display a colored mask area according to the color information. If each mask data holds a flag, it is useful to display a mask image according to flag content. For example, if the flag indicates "valid", the mask image is displayed. If the flag indicates "invalid", the display of the mask image is cancelled.

When the above-described configuration is employed, a mask image having a predetermined shape can be superimposed on a captured image. A video processing apparatus according to the present exemplary embodiment can superimpose the mask image in such a way as to bring a point obtained by averaging coordinate values of respective vertices r0, r1, r2, and r3 that define the mask area projected on the captured image into coincidence with the center of the mask image.

When the above-described configuration according to the present exemplary embodiment is employed, for example, compared to a case where an intersection point of diagonal lines of a mask area r0r1r2r3 projected on a captured image is brought into coincidence with the center of the mask image, it becomes feasible to reduce a deviation between the mask area and the mask image. Especially, the effects of the present exemplary embodiment can be enhanced when the mask area is present in a peripheral region of an imaging plane.

For example, according to an example illustrated in FIG. 8B, the width of a mask area projected on the coordinate plane becomes narrower when the width position moves toward an upper region of the drawing. In this case, an intersection point of diagonal lines of the mask area is positioned upward relative to the center of the mask area. If the mask image is superimposed on the mask area in such a manner that the intersection point of the diagonal lines coincides with the center of the mask image, the superimposed mask image deviates upward from the mask area. As a result, the mask image cannot cover a lower part of the mask area.

On the other hand, if the mask image is superimposed on the mask area by setting average coordinate values of respective vertices of the mask area as center coordinates according to the present exemplary embodiment, the superimposed mask image can fully cover the mask area.

As described above, the video processing apparatus according to the present exemplary embodiment can appropriately superimpose a mask image on a mask area to be projected on a flat plane without increasing the labor and time required in performing mask area settings.

In a second exemplary embodiment, an imaging apparatus capable of realizing a panning rotation and a tilting rotation is described below. When the imaging apparatus capable of realizing a panning rotation and a tilting rotation is employed, the position of a mask area of a display image moves according to a change in the imaging direction of the imaging apparatus. Accordingly, the superimposing position of the mask image moves in response to a change in the imaging direction of the imaging apparatus.

A video processing apparatus according to the present exemplary embodiment can appropriately superimpose a mask image on a mask area to be projected on a flat plane without increasing the labor and time required in performing mask area settings, even when the superimposing position of the mask image moves in response to a change in the imaging direction of the imaging apparatus.

Figure 5:
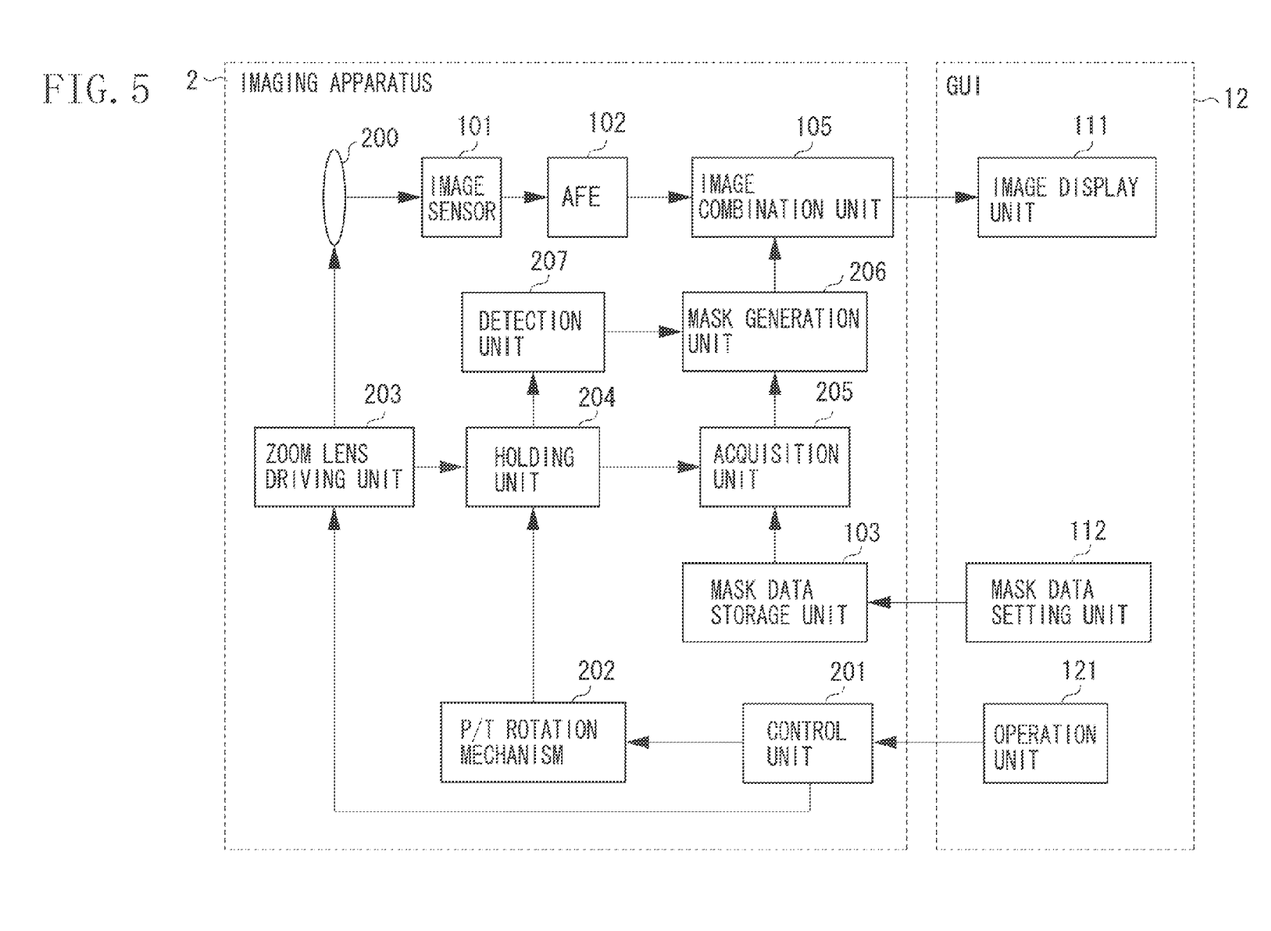
FIG. 5 is a block diagram illustrating an imaging apparatus 2 and a graphical user interface (GUI) 12 according to a second exemplary embodiment of the present invention.

First, an example configuration of an imaging apparatus 2 according to the second exemplary embodiment of the present invention is described below with reference to FIG. 5. The imaging apparatus 2 according to the second exemplary embodiment includes a control unit 201, a panning/tilting rotation mechanism 202, a zoom lens driving unit 203, a holding unit 204, an acquisition unit 205, and a detection unit 207, in addition to the above-described configuration of the imaging apparatus 1 described in the first exemplary embodiment.

Further, the imaging apparatus 2 includes an imaging lens group 200 and a mask generation unit 206. The imaging lens group 200 includes a zoom lens in addition to the imaging lens 100 of the imaging apparatus 1 described in the first exemplary embodiment. The mask generation unit 206 is different from the mask generation unit 104 of the imaging apparatus 1 in that the mask generation unit 206 performs processing in such a way as to correspond to the coordinate conversion in the panning, tilting, and zooming operations.

The control unit 201 can control the panning/tilting rotation mechanism 202 and the zoom lens driving unit 203 based on a command output from an operation unit 121. The panning/tilting rotation mechanism 202 is a mechanism capable of driving, in the panning and tilting directions, the entire body of the imaging apparatus 2. Further, the zoom lens driving unit 203 is a mechanism capable of driving the zoom lens of the imaging lens 200 to change the magnification (hereinafter, referred to as "zoom magnification").

The holding unit 204 can acquire and hold the zoom magnification and angular information relating to the panning rotation and the tilting rotation from the panning/tilting rotation mechanism 202 and the zoom lens driving unit 203. The acquisition unit 205 can access the holding unit 204 to acquire present values with respect to the panning angle, the tilting angle, and the zoom magnification.

The mask generation unit 206 can perform mask data coordinate conversion processing according to the values acquired by the acquisition unit 205. Further, the mask generation unit 206 can generate a mask image to be superimposed on a captured image.

An appropriate hardware configuration is employable to constitute the mask generation unit 206. Alternatively, if the imaging apparatus 2 includes a processor and a memory, the processor is functionally operable as the mask generation unit 206 when the processor executes a program loaded from the memory.

The detection unit 207 can dynamically detect a change in the panning rotation or the tilting rotation or a change in the zoom magnification, and can send a flag indicating a detected result to the mask generation unit 206. The remaining constituent components of the imaging apparatus 2 are identical to those described in the first exemplary embodiment, and therefore are denoted by the same reference numerals and descriptions thereof are not repeated.

Next, the GUI 12 is described in detail below. The GUI 12 includes the operation unit 121 in addition to the constituent components of the GUI 11 described in the first exemplary embodiment. The operation unit 121 of the GUI 12 can operate the panning/tilting rotation mechanism 202 and the zoom lens driving unit 203 of the imaging apparatus 2. The operation unit 121 enables users to input angular information relating to the panning rotation and the tilting rotation as well as zoom magnification of the imaging apparatus. The operation unit 121 can output the input value to the control unit 201.

The remaining constituent components of the GUI 12 are identical to those described in the first exemplary embodiment, and therefore are denoted by the same reference numerals and the descriptions thereof are not repeated. Further, the GUI 12 performs a mask data setting operation, which is similar to that described in the first exemplary embodiment and the description thereof is not repeated.

Next, example processing for generating a mask image and combining the generated mask image with a captured image, which can be performed by the imaging apparatus 2, is described below. First, the acquisition unit 205 acquires a present panning rotation angle (cam_pan) and a present tilting rotation angle (cam_tilt) of the imaging apparatus 2, in addition to a horizontal angle of view and a vertical angle of view at the present zoom magnification, from the holding unit 204.

Next, the mask generation unit 206 generates a mask image. An example operation of the mask generation unit 206 is described below with reference to FIG. 6. If the imaging apparatus 2 includes a built-in processor and a built-in memory, a processing flow illustrated in FIG. 6 indicates an example procedure of the processing that the processor can execute according to a program stored in the built-in memory.

Figure 6:
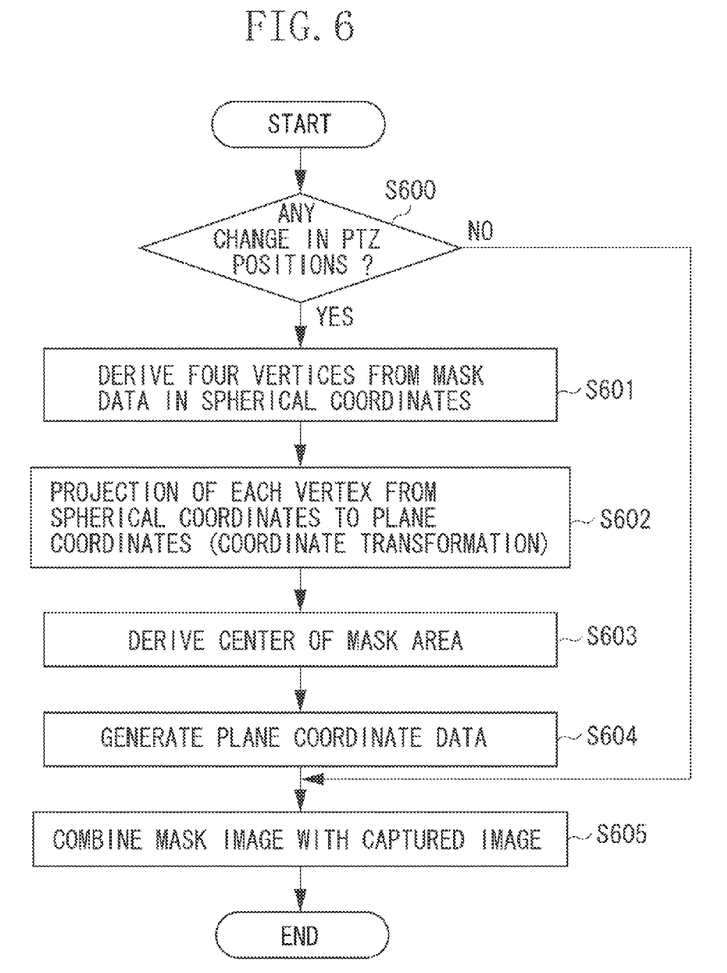
FIG. 6 is a flowchart illustrating an example procedure of mask image generation processing according to the second exemplary embodiment of the present invention.

The built-in processor of the imaging apparatus 2 is a computer, which can execute the program loaded from the built-in memory of the imaging apparatus 2 to control the mask generation unit 206. The built-in memory of the imaging apparatus 2 is a storage medium that stores the above-described program so that the program can be read by the processor when accessed by the processor.

First, in step S600, the mask generation unit 206 determines whether any one of the panning rotation angle, the tilting rotation angle, and the zoom magnification of the imaging apparatus, which have been acquired by the acquisition unit 205, has been changed. If it is determined that there is not any change in the panning rotation angle, the tilting rotation angle, and the zoom magnification of the imaging apparatus (No in step S600), the mask generation unit 206 superimposes the mask at the same position where the mask is presently superimposed.

On the other hand, if it is determined that there is a change in the angle/zoom information acquired by the acquisition unit 205 (Yes in step S600), the processing proceeds to step S601. In step S601, the mask generation unit 206 derives four vertices of a mask area in the spherical coordinates, which includes the imaging apparatus 1 positioned at the center thereof, based on the data acquired from the acquisition unit 205 as well as mask data.

An example method for deriving the four vertices of the mask area M is described below with reference to FIG. 7A. In the present exemplary embodiment, the mask area has a rectangular shape. However, the shape of the mask area is not limited to a rectangular shape.

Figure 7A:
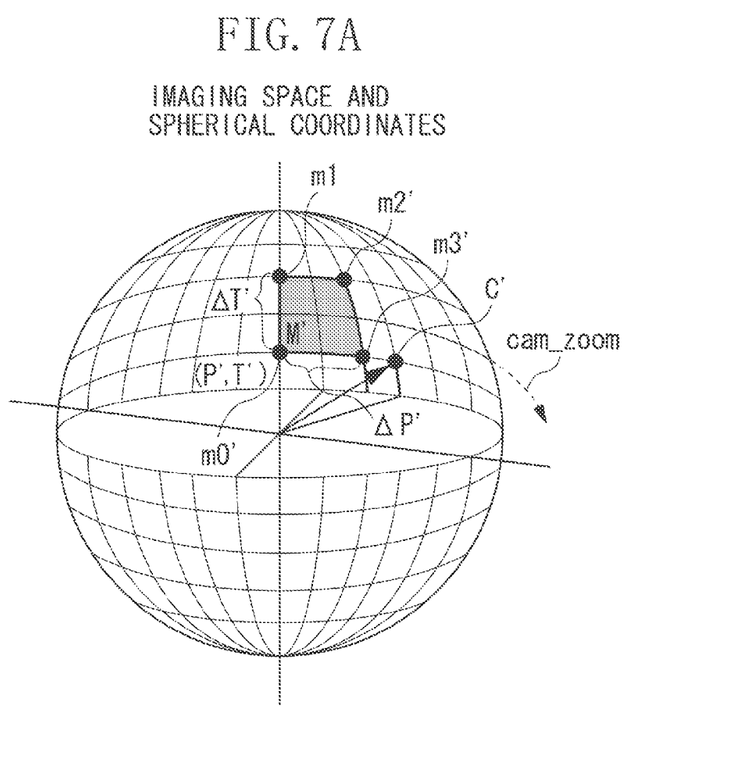
FIG. 7A illustrates spherical coordinates, which include the imaging apparatus 1 positioned at the center thereof, according to the second exemplary embodiment of the present invention.

FIG. 7A illustrates spherical coordinates, in which the imaging apparatus 2 is positioned at the center thereof. A mask area M' can be disposed in the spherical coordinates as illustrated in FIG. 7A. It is assumed that m0' (P', T') represents coordinate values of a start point of the mask area in the spherical coordinates, ΔT' represents the width of the mask area, and ΔP' represents the height of the mask area. The mask area M' has four vertices that can be expressed by m0' (P', T'), m1' (P', T'+ΔT'), m2' (P'+ΔP', T'+ΔT'), and m3' (P'+ΔP', T'), respectively, in the spherical coordinates.

Figure 7B:
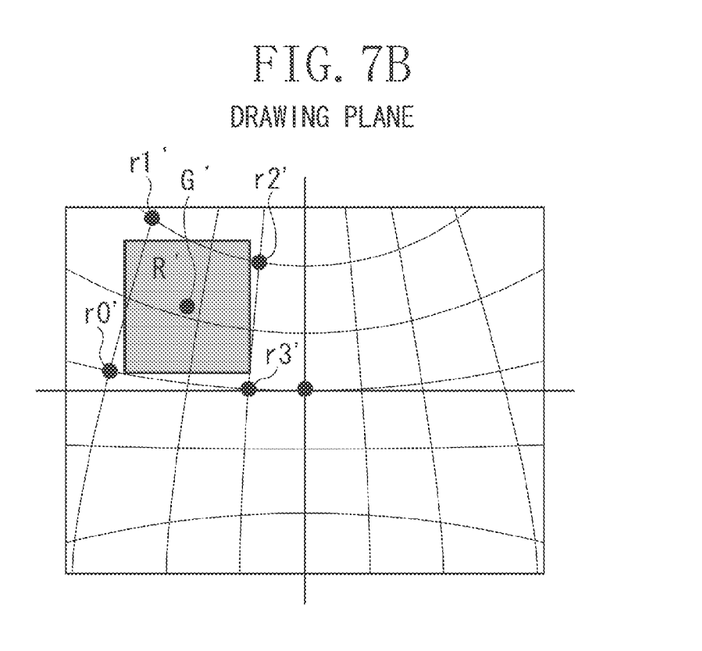
FIG. 7B illustrates a corresponding area, which is seen from the center of the spherical coordinates, when the mask area M is projected on the coordinate plane according to the second exemplary embodiment of the present invention.

Next, in step S602, the mask generation unit 206 projects each vertex of the mask area M' defined in the spherical coordinates onto the coordinate plane. FIG. 7B illustrates a corresponding area r0'r1'r2'r3', which is seen from the center of the spherical coordinates, when the mask area M' is projected on the coordinate plane.

In the present exemplary embodiment, the mask generation unit 206 is configured to project the mask area M' on the coordinate plane, which contacts at a point C' with the coordinate spherical, when the point C' is an intersection point of the optical axis of the imaging lens 100 and the coordinate spherical. The projection of the mask area M' onto the coordinate plane can be realized by converting spherical coordinates representing four vertices of the mask area M' derived in step S601 into corresponding plane coordinates.

Figure 7C:
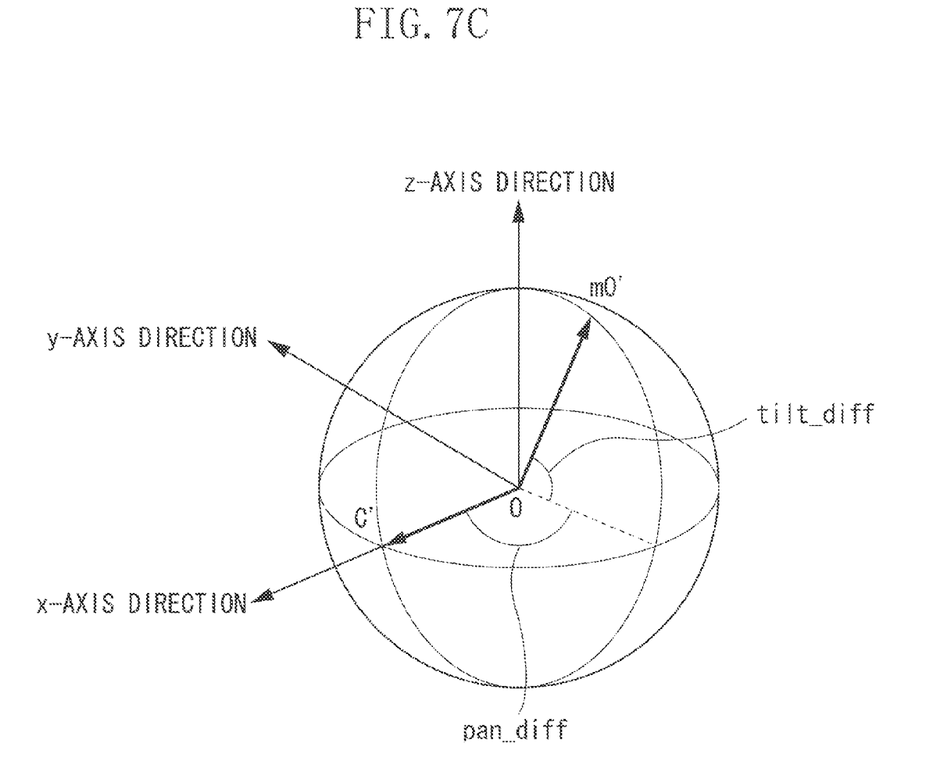
FIG. 7C illustrates coordinate axes in the spherical coordinates according to the first exemplary embodiment of the present invention.

Hereinafter, an example conversion of vertex coordinates of the mask area M' is described for each of depth component x, width component y, and height component z. As illustrated in FIG. 7C, "O" represents the center of the coordinate spherical, and the x axis is set to be identical to the direction of the optical axis when the imaging lens 200 of the imaging apparatus 2 is located at the center "O" of the coordinate spherical. Further, it is presumed that the radius of the coordinate spherical is equal to 1.

As an example, the coordinate conversion of the vertex m0' is described below. As illustrated in FIG. 7C, the vector extending from the center "O" to the point m0' has an angle pan_diff relative to the imaging direction of the imaging apparatus 2 in the horizontal direction and an angle tilt_diff in the vertical direction. In the present exemplary embodiment, the angles pan_diff and tilt_diff are obtainable from the present panning rotation angle (cam_pan) and the tilting rotation angle (cam_tilt) acquired by the acquisition unit 205.

First, the mask generation unit 206 obtains the position of the vertex m0' relative to the point "O." The position of the vertex m0' relative to the point "O" can be defined in the following manner with respect to each of the depth component x, the width component y, and the height component z.

$$|m0'-C'x|=\cos(\text{tilt\_diff})\cos(\text{pan\_diff})$$

$$|m0'-C'y|=\sin(\text{pan\_diff})\cos(\text{tilt\_diff})$$

$$|m0'-C'z|=\sin(\text{tilt\_diff}) \quad \text{(Formula 7)}$$

Next, the mask generation unit 206 obtains coordinate values of the point r0' on the coordinate plane. The point r0' is a projected point of the point m0' defined in the spherical coordinates. The coordinate plane contacts the spherical coordinates at the point C'. When r0_p' and r0_t' represent the horizontal angle and the vertical angle between the point C' and the point r0', respectively. These angles r0_p' and r0_t' can be defined by the following formulae.

$$r0\_p'=\arctan(|m0'-C'y|/|m0'-C'x|)$$

$$r0\_t'=\arctan(|m0'-C'z|/|m0'-C'x|) \quad \text{(Formula 8)}$$

Further, u0' and v0' represent the x component and the y component of the point r0' on the plane coordinates, respectively. When coordinate values C'x and C'y of the point C' define the origin, the x component u0' and the y component v0' can be defined by the following formulae.

$$u0'=C'x-(\text{width of image display area})*(r0\_p/\text{present horizontal angle of view of the imaging apparatus 2})$$

$$v0'=C'y+(\text{height of image display area})*(r0\_t/\text{present vertical angle of view of the imaging apparatus 2}) \quad \text{(Formula 9)}$$

In the present exemplary embodiment, it is presumed that the acquisition unit 205 acquires information relating to the present horizontal angle of view and the present vertical angle of view of the imaging apparatus 2 and outputs the acquired information to the mask generation unit 206.

Similar to the first exemplary embodiment, if the aspect ratio of the screen is taken into consideration, it is useful to multiply the width or the height of the image display area by the aspect ratio in the calculation defined by the above-described Formula 3. Similarly, it is feasible to convert other vertex points m1', m2', and m3'. As a result, the mask generation unit 206 can obtain coordinate r1' (u1', v1'), r2' (u2', v2'), and r3' (u3', v3') on a drawing plane.

In the above-described embodiment, an example method is employed to project an area defined in the spherical coordinates onto a coordinate plane. However, the conversion method is not limited to the above-described method. Any other method is employable if it can obtain coordinate values of vertices that define the corresponding area, i.e., an area obtainable when a designated area defined in the spherical coordinates is projected on the coordinate plane.

As described above, the mask generation unit 206 can identify a corresponding area, i.e., an area obtainable when the mask area is projected on the xy coordinate plane, which represents a captured image to be displayed on the image display unit 111.

Next, in step S603, the mask generation unit 206 derives plane coordinates of a central point of the mask area M by calculating the arithmetic mean of coordinate values representing respective points r'1, r'2, r'3, and r'4. When gu' and gv' represent mean values with respect to the x coordinate value and the y coordinate value of four vertices that define the mask area M, i.e., the values derived in step S601, on the coordinate plane, the central point G' (gu', gv') can be defined by the following formulae.

$$gu'=(u0'+u1'+u2'+u3')/4$$

$$gv'=(v0'+v1'+v2'+v3')/4 \quad \text{(Formula 10)}$$

As described above, the mask generation unit 206 calculates mean values with respect to the x coordinate value and the y coordinate value of respective vertices that define the corresponding area on the xy coordinate plane.

Subsequently, in step S604, the mask generation unit 104 obtains the width and the height of a mask image to be superimposed on the corresponding area. When W' and H' represent the width and the height of the mask image, respectively, these values can be defined by the following formulae.

$$W'=(\text{width of image display area})*\Delta p'/\text{present horizontal angle of view of the imaging apparatus 2}$$

$$H'=(\text{height of image display area})*\Delta t'/\text{present vertical angle of view of the imaging apparatus 2} \quad \text{(Formula 11)}$$

In the formula 11, $\Delta p'$ represents an angle between the point m0' and the point m3' on the xy plane of the xyz space illustrated in FIG. 7C. Further, $\Delta t'$ represents an angle between the point m0' and the point m1' on the xz plane of the xyz space illustrated in FIG. 7C.

In the method for calculating the width and the height of the mask image, it is feasible to calculate W' and H' values considering the aspect ratio of the screen, similar to the calculation defined by the above-described Formula 3. The method for calculating the width and the height of the mask image is not limited to the above-described method. For example, it is feasible to calculate the width and the height of the mask image appropriately based on input setting values.

As described above, the mask generation unit 206 calculates the width and the height of the mask image on the xy coordinate plane based on the positional information.

In the present exemplary embodiment, if it is presumed that the mask image to be superimposed has a rectangular shape, the lower left reference point of the mask image has coordinate values (X', Y') that can be expressed using the following formula.

$$X'=gu'-W'/2$$

$$Y'=gv'-H'/2 \quad \text{(Formula 12)}$$

Through the above-described procedure, the mask generation unit 206 can acquire plane coordinate data R' (X', Y', W', H').

Subsequently, in step S605, the mask generation unit 206 causes the image combination unit 105 to combine the mask image having the width W' and the height H' with the captured image from a start point defined by plane coordinate data (X', Y').

In response to an instruction received from the mask generation unit 206, the image combination unit 105 superimposes the mask image on the captured image. As described above, the image combination unit 105 superimposes the mask image on the captured image in such a way as to bring a point defined by an average x coordinate value and an average y coordinate value, which can be calculated by the mask generation unit 206, into coincidence with a point defined by a midpoint in the height direction and a midpoint in the width direction of the mask image.

Subsequently, the image combination unit 105 causes the image display unit 111 to display a combination of the captured image and the mask image superimposed thereon. If there is a plurality of pieces of mask data, the mask generation unit 206 and the image combination unit 105 can repeat the processing according to the above-described procedure to display each mask image on a designated part of the captured image.

If each mask data holds color information, it is useful to display a colored mask area according to the color information. If each mask data holds a flag, it is useful to display a mask image according to flag content. For example, if the flag indicates "valid", the mask image is displayed. If the flag indicates "invalid", the display of the mask image is cancelled.

Further, if the detection unit 207 detects a change in the panning angle, the tilting angle, and the zoom magnification, the mask generation unit 206 updates the plane coordinate data R' and the image combination unit 105 draws a captured image.

When the above-described configuration is employed, a mask image can be appropriately superimposed on a designated mask area of a flat plane, even in a case where the superimposing position the mask image moves in response to a change in the imaging direction of the imaging apparatus, as an additional effect according to the present exemplary embodiment, which has not been described in the first exemplary embodiment of the present invention.

According to the present exemplary embodiment, even when the superimposing position of a mask image moves in response to a change in the imaging direction, it is feasible to superimpose the mask image on an appropriate position without requiring any specific correction (for example, about the size of the mask image) according to a change amount. Accordingly, the present exemplary embodiment can reduce the amount of processing to be required for the superimposition of the mask image.

However, according to the present invention, it is feasible to perform the superimposition of the mask image according to the method described in the present exemplary embodiment and perform appropriate correction (for example, about the size of the mask image) according to a change amount.

Further, according to the present exemplary embodiment, it is unnecessary to change the direction of a camera each time when the mask area setting is performed to shift the mask area toward the center of the captured image, as described in the conventional example.

As described above, the video processing apparatus according to the present exemplary embodiment can appropriately superimpose a mask image on a mask area to be covered on a flat plane without increasing the labor and time required in performing mask area settings.

Although the present invention has been described with reference to some exemplary embodiments, the present invention is not limited to the above-described exemplary embodiments and can be variously modified without departing from the scope of the invention.

For example, the mask area to be projected on the xy coordinate is not so distorted in the central region. The deviation of a mask area relative to an image portion to be covered by a mask image is relatively small in the central region. Therefore, it is useful to apply the present exemplary embodiment only when the mask area is positioned in a peripheral region of a display screen, while cancelling the application of the present exemplary embodiment if the mask area is positioned in the central region of the display screen.

In this case, it is useful to provide a detection unit configured to detect the position of a mask area on the display screen and a determination unit configured to determine whether the mask area is positioned in the peripheral region of the display screen. It is useful to perform the mask image superimposition processing according to the present exemplary embodiment only when the mask area is positioned in the peripheral region.

The detection unit is, for example, capable of detecting an angle formed between the optical axis of the imaging lens group 200 and a specific point (e.g., the center or a vertex of the mask area) on the mask area. Further, if the angle detected by the detection unit exceeds a predetermined angle, the mask image superimposition processing is performed according to the present exemplary embodiment.

When the above-described processing is employed, the amount of calculations can be reduced if the mask area is positioned in the central region of the xy coordinates.

In the first exemplary embodiment and the second exemplary embodiment, the video processing apparatus calculates mean values with respect to the x coordinate value and the y coordinate value of respective vertices that define a mask area projected on the xy coordinate plane representing a captured image. Further, the video processing apparatus can use, in the superimposition processing, a mask image having center coordinates that correspond to the calculated coordinate values. However, the mean value calculation method is not limited to the above-described method.

For example, it is useful to select a maximum value and a minimum value with respect to the x coordinate value from the coordinate values representing all vertices of a mask area projected on the xy coordinate plane and obtain a mean value of the x coordinate value based on the selected maximum and minimum values. Similarly, it is useful to select a maximum value and a minimum value with respect to the y coordinate value and obtain a mean value of the y coordinate value based on the selected maximum and minimum values. The video processing apparatus can use, in the superimposition processing, a mask image having center coordinates that correspond to the calculated x and y coordinate values.

In this case, similar to the first exemplary embodiment or the second exemplary embodiment, the video processing apparatus can prevent the superimposed mask image from being deviated from the mask area. Accordingly, the video processing apparatus according to the present exemplary embodiment can appropriately superimpose a mask image on a mask area to be covered on a flat plane without increasing the labor and time required in performing mask area settings.

Further, the video processing apparatus according to the first exemplary embodiment or the second exemplary embodiment generates mask data based on a mask image. However, according to another exemplary embodiment, the video processing apparatus can be configured to use a predetermined mask image stored beforehand in a storage unit (not illustrated) as an image to be superimposed.

Even in this case, effects similar to those described in the first exemplary embodiment or in the second exemplary embodiment can be obtained by performing the mask image superimposition processing in such a way as to bring a point defined by an average x coordinate value and an average y coordinate value, which are average calculated coordinates, into coincidence with a point defined by a midpoint in the height direction and a midpoint in the width direction of the mask image.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-242225 filed Oct. 28, 2010, which is hereby incorporated by reference herein in its entirety.

What is claimed is:

1. A video processing apparatus comprising:
    an identifying unit configured to identify a designated area in spherical coordinates of which origin corresponds to a position of an imaging unit;
    a display control unit configured to cause a display unit to display an image captured by the imaging unit;
    a display processing unit configured to perform a process to display a mask image on a corresponding area that represents the captured image to be displayed on the display unit, which is obtained when the designated area is projected on an xy coordinate plane; and
    a determination unit configured to determine mean values with respect to x coordinate value and y coordinate value of vertices that define the corresponding area, on the xy coordinate plane,
    wherein the display processing unit is configured to display the mask image on the captured image such that a position of a first point on the xy coordinate plane corresponds to a position of a second point on the xy coordinate plane, the second point defined by a midpoint in the height direction and a midpoint in the width direction of the mask image on the xy coordinate plane, and
    wherein the first point has a x coordinate value and a y coordinate value identical to the mean values determined by the determination unit with respect to the x coordinate value and the y coordinate value.

2. The video processing apparatus according to claim 1, wherein the identifying unit is configured to identify the position, the width, and the height of the designated area in the spherical coordinates, the video processing apparatus further comprising:
    a derivation unit configured to derive a height and a width of the mask image on the xy coordinate plane based on the width and the height of the designated area; and
    a generation unit configured to generate a mask image having the height and the width derived by the derivation unit.

3. The video processing apparatus according to claim 1, further comprising:
    a pan drive unit configured to drive the imaging unit in a panning direction; and
    a tilt drive unit configured to drive the imaging unit in a tilting direction,
    wherein the determination unit is configured to perform the process of displaying the mask image on the captured image when the pan drive unit or the tilt drive unit drives the imaging unit.

4. The video processing apparatus according to claim 1, wherein the identifying unit is configured to identify an area in the spherical coordinates based on a pan angle, a tilt angle, and a focusing length of the imaging unit.

5. A video processing method for a video processing apparatus that causes a display unit to display an image captured by an imaging unit, the method comprising:
    identifying a designated area in spherical coordinates of which origin corresponds to a position of an imaging unit;

projecting the designated area on an xy coordinate plane that represents the captured image to be displayed on the display unit;

determining mean values, on the xy coordinate plane, with respect to x coordinate value and y coordinate value of vertices that define a corresponding area, which is obtained when the designated area is projected on the xy coordinate plane; and performing a process to display the mask image on the captured image such that a position of a first point on the xy coordinate plane corresponds to a position of a second point on the xy coordinate plane, the second point defined by a midpoint in the height direction and a midpoint in the width direction of the mask image on the xy coordinate plane, and wherein the first point has a x coordinate value and a y coordinate value identical to the calculated mean values with respect to the x coordinate value and the y coordinate value.

6. The video processing method according to claim 5, wherein information to be identified includes the position, the width, and the height of the designated area in the spherical coordinates, the video processing method further comprising:

deriving a height and a width of the mask image on the xy coordinate plane based on the width and the height of the designated area; and generating a mask image having the derived height and the derived width.

7. The video processing method according to claim 5, wherein a pan drive unit is provided to drive the imaging unit in a panning direction, a tilt drive unit is provided to drive the imaging unit in a tilting direction, and the process of displaying the mask image on the captured image is performed when the pan drive unit or the tilt drive unit drives the imaging unit.

8. A non-transitory computer-readable storage medium storing a video processing program that causes a computer, which displays an image captured by an imaging unit on a display unit, to perform an image processing method, the method comprising:

identifying a designated area in spherical coordinates of which origin corresponds to a position of an imagine unit;

projecting the designated area on an xy coordinate plane that represents the captured image to be displayed on the display unit;

determining mean values, on the xy coordinate plane, with respect to x coordinate value and y coordinate value of vertices that define a corresponding area, which is obtainable when the designated area is projected on the xy coordinate plane; and performing a process to display the mask image on the captured image such that a position of a first point on the xy coordinate plane corresponds to a position of a second point on the xy coordinate plane, the second point defined by a midpoint in the height direction and a midpoint in the width direction of the mask image on the xy coordinate plane, and wherein the first point has a x coordinate value and a y coordinate value identical to the calculated mean values with respect to the x coordinate value and the y coordinate value.

9. The storage medium according to claim 8, wherein information to be identified includes the position, the width, and the height of the designated area in the spherical coordinates, the method further comprising:

deriving a height and a width of the mask image on the xy coordinate plane based on the width and the height of the designated area; and generating a mask image having the derived height and the derived width.

10. The storage medium according to claim 8, wherein a pan drive unit is provided to drive the imaging unit in a panning direction, a tilt drive unit is provided to drive the imaging unit in a tilting direction, and the process of displaying the mask image on the captured image is performed when the pan drive unit or the tilt drive unit drives the imaging unit.

* * * * *